United States Patent [19]

Sakamoto

[11] Patent Number: 4,903,143
[45] Date of Patent: * Feb. 20, 1990

[54] IMAGE PROCESSING APPARATUS

[75] Inventor: Masahiro Sakamoto, Tokyo, Japan

[73] Assignee: Canon Kabushiki Kaisha, Tokyo, Japan

[*] Notice: The portion of the term of this patent subsequent to Aug. 11, 2004 has been disclaimed.

[21] Appl. No.: 61,349

[22] Filed: Jun. 15, 1987

Related U.S. Application Data

[63] Continuation of Ser. No. 783,148, Oct. 2, 1985, Pat. No. 4,686,579.

[30] Foreign Application Priority Data

Oct. 11, 1984 [JP] Japan ............................. 59-211477

[51] Int. Cl.$^4$ .............................................. H04N 1/40
[52] U.S. Cl. ................................... 358/457; 358/462; 358/466
[58] Field of Search ............... 358/280, 282, 283, 457, 358/462, 466

[56] References Cited

U.S. PATENT DOCUMENTS

| 4,414,581 | 11/1983 | Kato ..................................... 358/466 |
| 4,549,220 | 10/1985 | Suzuki ................................. 358/457 |
| 4,686,579 | 8/1987 | Sakamoto ........................... 358/466 |

FOREIGN PATENT DOCUMENTS

| 0008739 | 3/1980 | European Pat. Off. . |
| 0055834 | 7/1982 | European Pat. Off. . |
| 0089931 | 9/1983 | European Pat. Off. . |
| 0100811 | 2/1984 | European Pat. Off. . |
| 2103449 | 2/1983 | United Kingdom . |
| 2114847 | 8/1983 | United Kingdom . |
| 2115256 | 9/1983 | United Kingdom . |
| 2123647 | 2/1984 | United Kingdom . |
| 2127647 | 4/1984 | United Kingdom . |
| 2153619 | 8/1985 | United Kingdom . |

Primary Examiner—Howard W. Britton
Attorney, Agent, or Firm—Fitzpatrick, Cella, Harper & Scinto

[57] ABSTRACT

There is an image processing apparatus for use in a facsimile, electronic file, reader, digital copier, or the like. This apparatus has an image discriminating function and a high operating speed and comprises a pixel data input circuit and a circuit for processing the pixel data inputed from input circuit, in which the processing circuit has a discriminating circuit for detecting an amount of change in density level of the input pixel data for every pixel and discriminating the content of the image of the objective pixel data and a selector for selecting the processing mode of the projective pixel data in accordance with the result of the discrimination. Either half-tone processing mode or the non-half-tone processing mode is selected by the selector on the basis of the result of the discrimination. The non-half-tone processing mode is continuously selected for a determined period of time irrespective of the result of the discrimination.

23 Claims, 6 Drawing Sheets

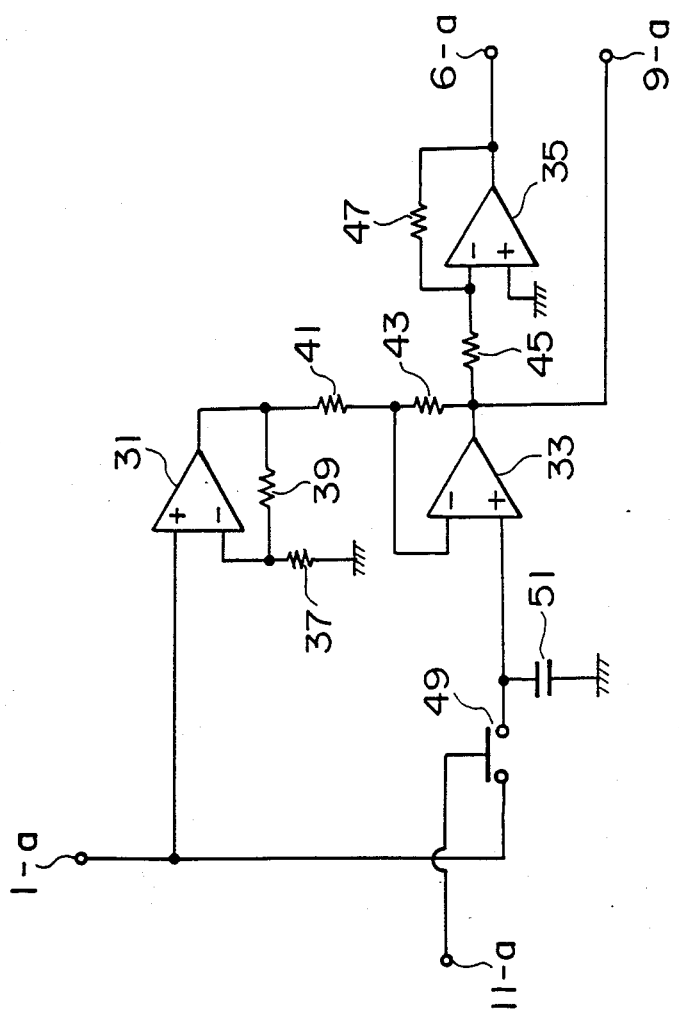
F I G. 5

IMAGE PROCESSING APPARATUS

This is a continuation of application Ser. No. 783,148, filed Oct. 2, 1985, now U.S. Pat. No. 4,686,579.

BACKGROUND OF THE INVENTION

1. Field of the Invention

The present invention relates to an image processing apparatus which is suitable for use in, for example, a facsimile apparatus, an electronic filing apparatus, an image reader, a digital copier, or the like.

2. Description of the Prior Art

According to a conventional method of binarized gradation processing an image by way of a dither method, the image signal read out is directly compared as an analog signal with a dither threshold value or after it has been converted to the digital signal, this digital signal is compared with the dither threshold value and, in this case, the dither threshold value is two-dimensionally changed in correspondence to the division of the read image.

FIG. 1 is a diagram showing a concept of binarization by way of a dither method. The image signal is compared with the dither threshold value stored in a memory 101 such as a ROM or the like by a comparator 100. For example, a white signal is outputted when the image signal is higher than the dither threshold value, while a black signal is outputted in the opposite case. The values shown in the memory 101 represent the dither threshold values.

By use of this method, the image of a photograph or the image of continuous gradations of a half-tone can be reproduced as a beautiful gradation image. On the contrary, however, there is a drawback that the resolution deteriorates since pattern images such as characters, diagrams, or the like are also subjected to gradation processing.

SUMMARY OF THE INVENTION

It is an object of the present invention to eliminate the foregoing drawbacks.

Another object of the invention is to provide an image processing apparatus in which a reproduced image of high quality is obtained.

Still another object of the invention is to improve an image processing apparatus functioning to discriminate an image.

Still another object of the invention is to provide an image processing apparatus which can obtain a desired reproduced image with a simple construction.

Still another object of the invention is to provide an image processing apparatus functioning to discriminate an image in which a high-speed process can be performed.

Still another object of the invention is to provide an image processing apparatus which can reproduce an image which is very close to the original image.

According to the present invention, these objects are obtained by providing an apparatus in which means are provided for detecting peak values and for detecting an amount of change in density levels, as well as means for selecting a processing mode on the basis of a discrimination of image content relating to the input pixel data based on the detected amount of change in density level and on an output from the peak value detecting means. Respective means may also be provided for half-tone processing and non-half tone processing, those two types of processing being two selectable modes.

Other objects and features of the present invention will to more fully appreciated from the following detailed description and the appended claims with reference to the accompanying drawings.

BRIEF DESCRIPTION OF THE DRAWING

FIG. 5 is a circuit diagram showing a partially modified form of the circuit of FIG. 3.

DETAILED DESCRIPTION OF THE PREFERRED EMBODIMENTS

An embodiment of the present invention will now be described hereinbelow with reference to the drawings.

Figure 1:
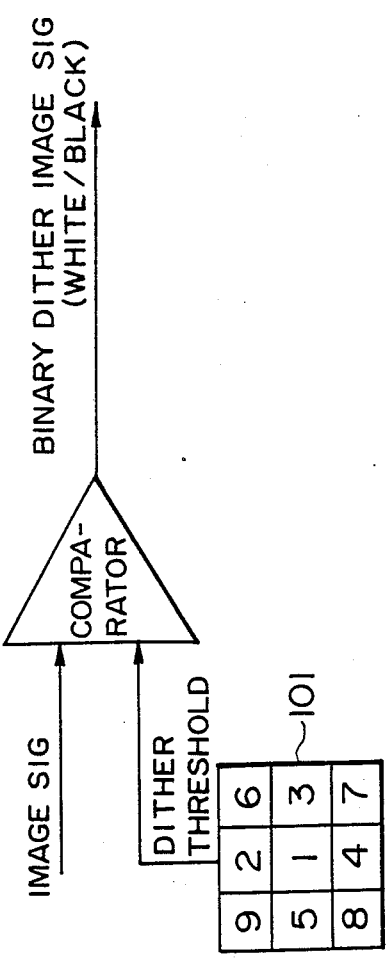
FIG. 1 is a diagram showing binarization by way of a dither method according to a conventional technology.
Figure 2:
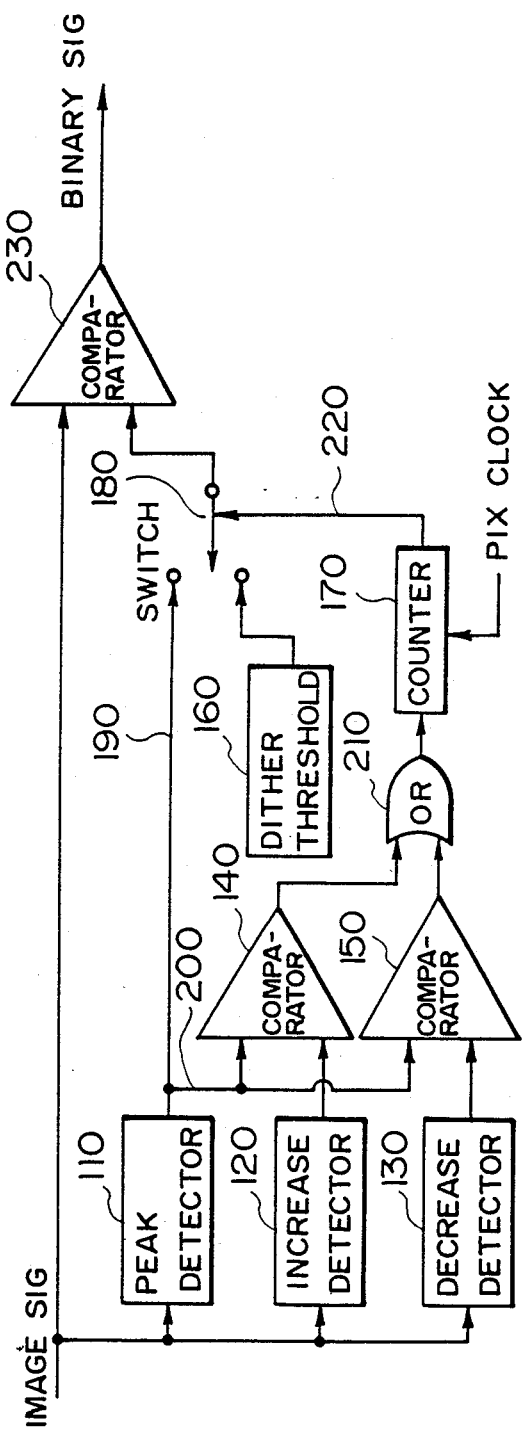
FIG. 2 is a block diagram of an image processing apparatus to explain a first preferred embodiment of the present invention.

FIG. 2 is a block diagram of the first preferred embodiment of an image processing apparatus of the present invention.

It is an outline of the first embodiment that when an image signal Video outputted from, e.g., a reader is binarized by a comparator 230, one of two kinds of threshold values is selected as a threshold value for comparison by a switch 180 in accordance with the state of the image.

In this case, when the image signal does not change quickly, namely, in the case of a gradation image (e.g., a half-tone image such as a photograph or the like), a switch control signal 220 is true and a dither threshold value 160 is selected by the switch 180. When the image signal changes quickly, that is in the case of a pattern image such as a character, diagram or the like, a non-dither threshold value 190, which is decided selected depending on the light and shade level of the pixel of the image signal inputted so far, is selected by the switch 180.

In other words, when the image signal changes considerably, the timing when the image signal largely varies from black to white is detected by an increase detector 120 or the timing when it largely changes from white to black is detected by a decrease detector 130. These increase and decrease change amounts are compared with a density level 200 which is determined on the basis of the peak value of the image signal stored in a peak detector 110 by comparators 140 and 150.

When the image signal largely varies, either of the outputs of the comparators 140 and 150 is true, so that a counter 170 is triggered by an OR gate 210. The output 220 of the counter 170 becomes false for the period of time from the time when the counter 170 is triggered until the number of pixels becomes a predetermined constant value. Since the switch control signal 220 becomes false, the switch 180 selects the non-dither threshold value 190. This non-dither threshold value is determined on the basis of the peak value of the image signal inputted in the past.

A construction for digital processing with regard to the embodiment shown in FIG. 2 can be easily realized by using ordinary comparators as the comparators 140 and 150 or the like, a multiplexer as the switch, and memories, subtractors, comparators, and the like as the increase or increment detector 120 and decrease or decrement detector 130.

Figure 3:
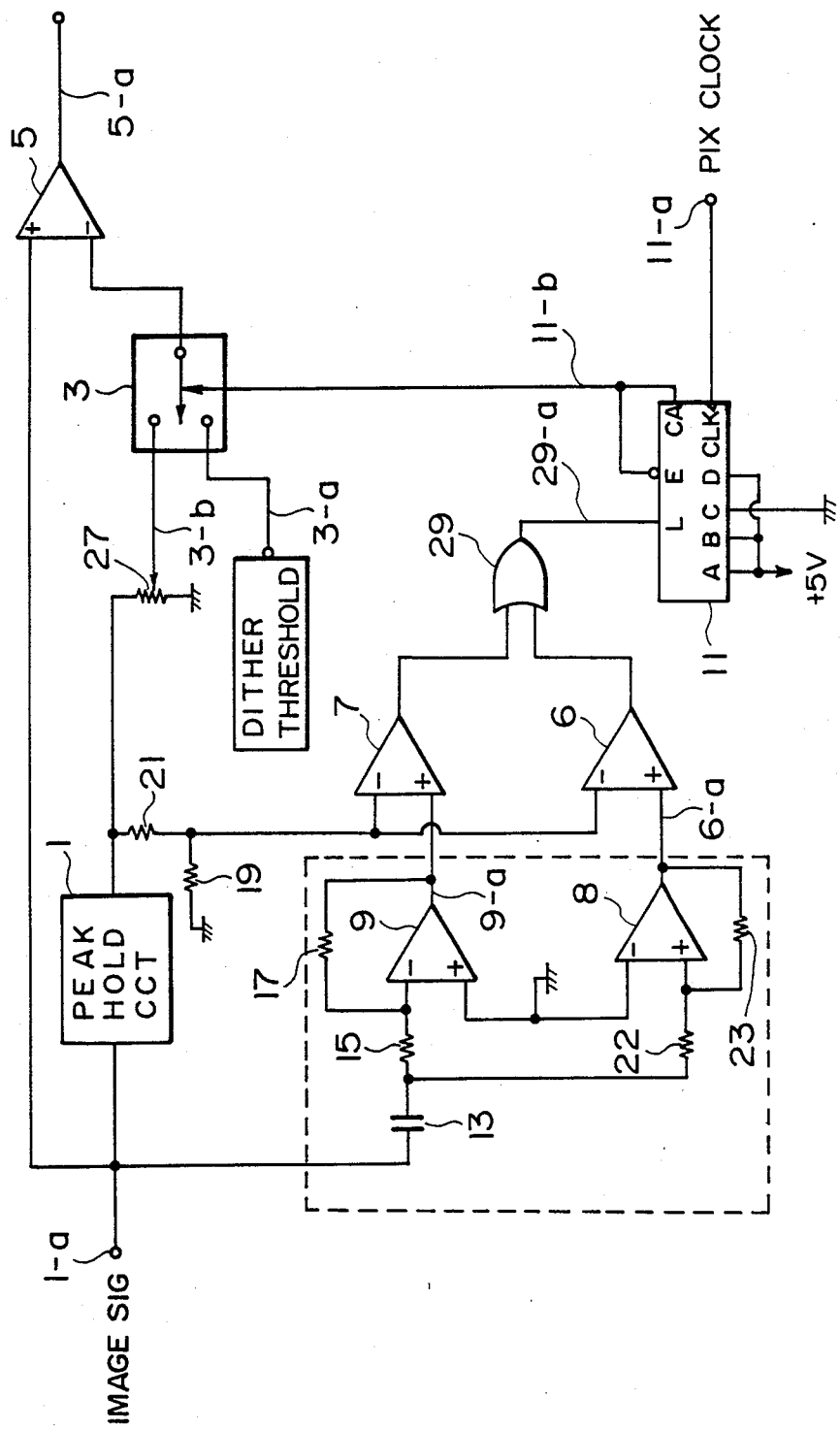
FIG. 3 is a circuit diagram of an image processing apparatus to explain the preferred second embodiment.

FIG. 3 is a circuit diagram showing one embodiment of an image processing apparatus constructed in a manner such that a part of the embodiment shown in FIG. 2 is processed in an analog manner.

In FIG. 3, reference numeral 1 denotes a peak hold circuit; 3 is an analog switch; 5, 6 and 7 comparators; 8 and 9 operational amplifiers; 11 a 4-bit binary counter; 13 a capacitor; 15, 17, 19, 21, 22, and 23 resistors; 27 a variable resistor; and 29 and OR gate.

There is the following correspondence between the arrangements of FIGS. 2 and 3. The comparators 140, 150 and 230 are respectively replaced by the comparators 7, 6 and 5. The switch 180 is replaced by the analog switch 3. The peak detector 110 is replaced by the peak hold circuit 1. The counter 170 is replaced by the 4-bit binary counter 11. The increase detector 120 and decrease detector 130 are respectively replaced by the operational amplifiers 8, 9, the capacitor 13, and the resistors 15, 17, 22 and 23. An input signal is inputted to a terminal 1-$a$. A dither threshold value of an analog level is inputted to a terminal 3-$a$. A pixel clock is inputted to a terminal 11-$a$.

The circuit of FIG. 3 will now be described in detail with reference to a timing chart of FIG. 4.

Figure 4:
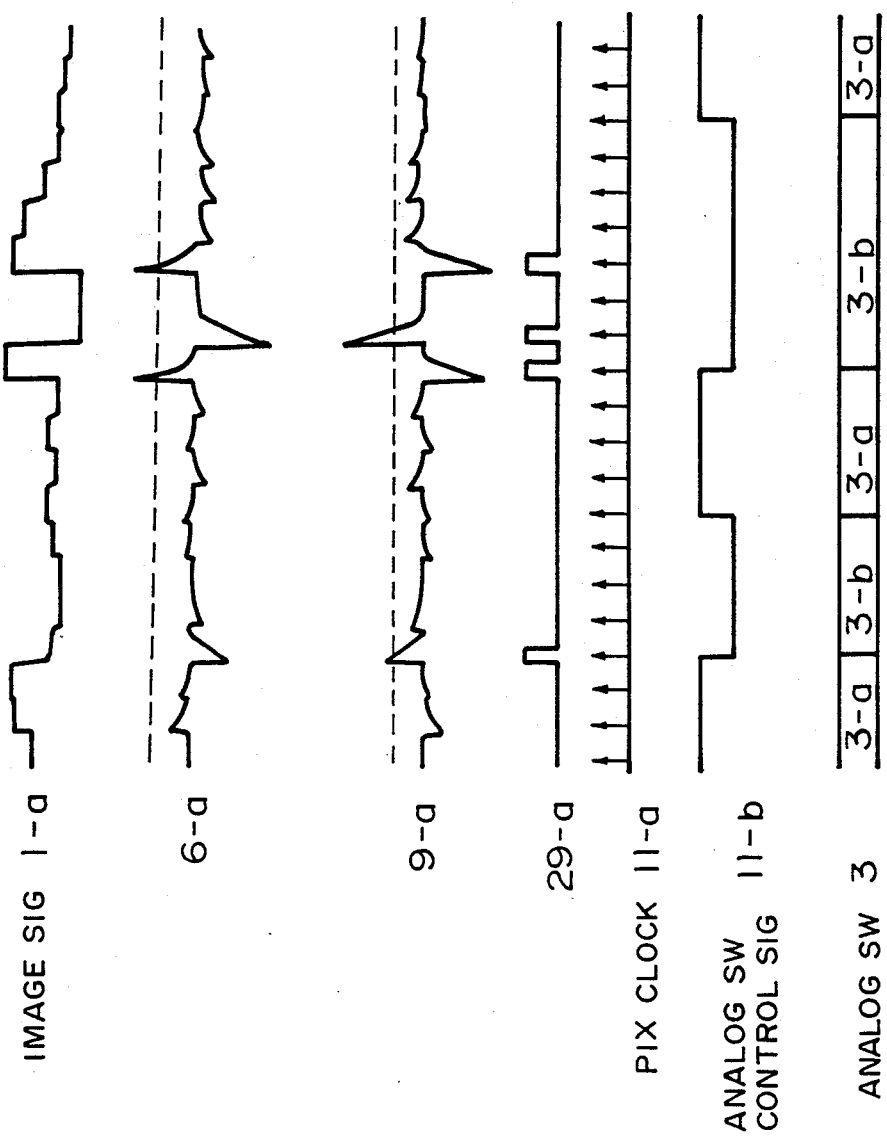
FIG. 4 is a timing chart of the circuit shown in FIG. 3.

The analog image signal shown in FIG. 4 is inputted to the input terminal 1-$a$ and differentiated by the capacitor 13 and resistor 15. Due to this differentiating process, the change amount of the input image signal is taken out.

The differentiated signal is respectively non-inversion amplified and inversion amplified by the operational amplifiers 8 and 9, so that signals 6-$a$ and 9-$a$ are derived. The signals 6-$a$ and 9-$a$ are inputted to (+) input terminals of the comparators 6 and 7, respectively. The proper voltages divided by the resistors 19 and 21 from the peak value voltage of the image signal 1-$a$ are held in the peak hold circuit 1 and inputted to (−) input terminals of the comparators 6 and 7, respectively. The voltages inputted to the (−) input terminals of the comparators 6 and 7 are shown by broken lines of 6-$a$ and 9-$a$ in FIG. 4. Namely, in this embodiment, the amount of change in density is detected for every pixel on the basis of the peak value of the image signal inputted so far.

When the density level difference between the objective pixel and the pixel immediately before it becomes larger than the divided voltages mentioned above in this manner, comparators 6 and 7 output signals indicative of true. That is, the timing when the image signal largely changes from black to white is detected by the comparator 6. The timing when the image signal largely changes from white to black is detected by the comparator 7. In this embodiment, the content of the image (i.e., an intermediate gradation image such as a photograph or the like or a line image such as a character or the like) can be discriminated on a realtime basis.

In this way, an output 29-$a$ of the OR gate 29 becomes a signal to which the outline of a pattern image such as a character or the like is mainly reflected. The signal 29-$a$ is inputted to an L terminal (load terminal) of the counter 11.

The counter 11 is a 4-bit binary counter and the pixel clock 11-$a$ is inputted to its CLK terminal. When the count value of the counter 11 becomes "15", a true signal is outputted at a CA terminal as a carry out terminal.

The CA terminal is connected to an E terminal. When the signal at the CA terminal becomes true, the signal at the E terminal becomes true, so that the count-up of the counter 11 is stopped. Thereafter, it is held stopped until the true signal is inputted to the L terminal and the count value of the counter 11 is preset to a value other than "15".

The preset value is "11" in the case of this embodiment. Therefore, the signal at the CA terminal (i.e., an analog switch control signal 11-$b$) is held to be false for the period of time from the time when the true signal is inputted to the L terminal until four pixel clocks have been counted.

In this manner, whenever the image signal corresponding to the outline of such as a character, pattern image or the like is inputted, the counter 11 sets the analog switch control signal 11-$b$ to be false for the period of time of four pixel clocks. For this period of time 3-$b$, the peak value voltage outputted from the peak hold circuit 1 is divided by the resistor 27 and inputted as a non-dither threshold value (threshold value for a pattern image).

It is desirable to use an electronic switch such as, e.g., an FET (field effect transistor) or CMOS (complementary metal oxide film semiconductor) or the like as the analog switch 3.

The analog switch 3 selects the signal 3-$a$ when the signal 11-$b$ is true and the signal 3-$b$ when the signal 11-$b$ is false. The dither threshold value is inputted to the terminal 3-$a$ synchronously with the pixel clock. The voltage derived by dividing the peak value of the image signal by the variable resistor 27, namely, the threshold value fitted for a pattern image such as a character, diagram or the like is inputted to the terminal 3-$b$. The threshold value selected by the analog switch 3 is inputted to the comparator 5 and the image signal is binarized on the basis of this threshold value.

This binarized image signal 5-$a$ is sent to a binary printer. A well-known laser beam printer, thermal printer, ink jet printer, or the like may be used as the binary printer.

In this manner, the dither threshold value is used for the image signal of continuous gradations such as a photograph or the like and the gradation process (intermediate gradation process) is carried out. On one hand, binarization (non-intermediate gradation process) by way of the threshold value fitted for a pattern image is executed for a pattern image or the like.

In the embodiment, discrimination has been made with respect to the case where the 4-bit binary counter is used as the counter 11 and the preset value is set to "11". However, by use of a counter having a long bit length or by setting the preset value to a value other than "11", the pulse interval of the analog switch control signal 11-$b$ can be set to any other appropriate value.

In addition, the binarizing process is carried out using the comparator in the above described preferred embodiment. However, the invention may be also applied to a device in which the image signal itself is inputted as address data into a memory such as a ROM or the like and the binary data of "1" or "0" is taken out from this memory. In this case, it is necessary to convert the analog image signal to the digital signal by use of an A/D converter.

Further, by variably changing the threshold value by way of the variable resistor 27, the threshold value which is optimum for binarization, such as a pattern image or the like, can be selected.

Figure 6:
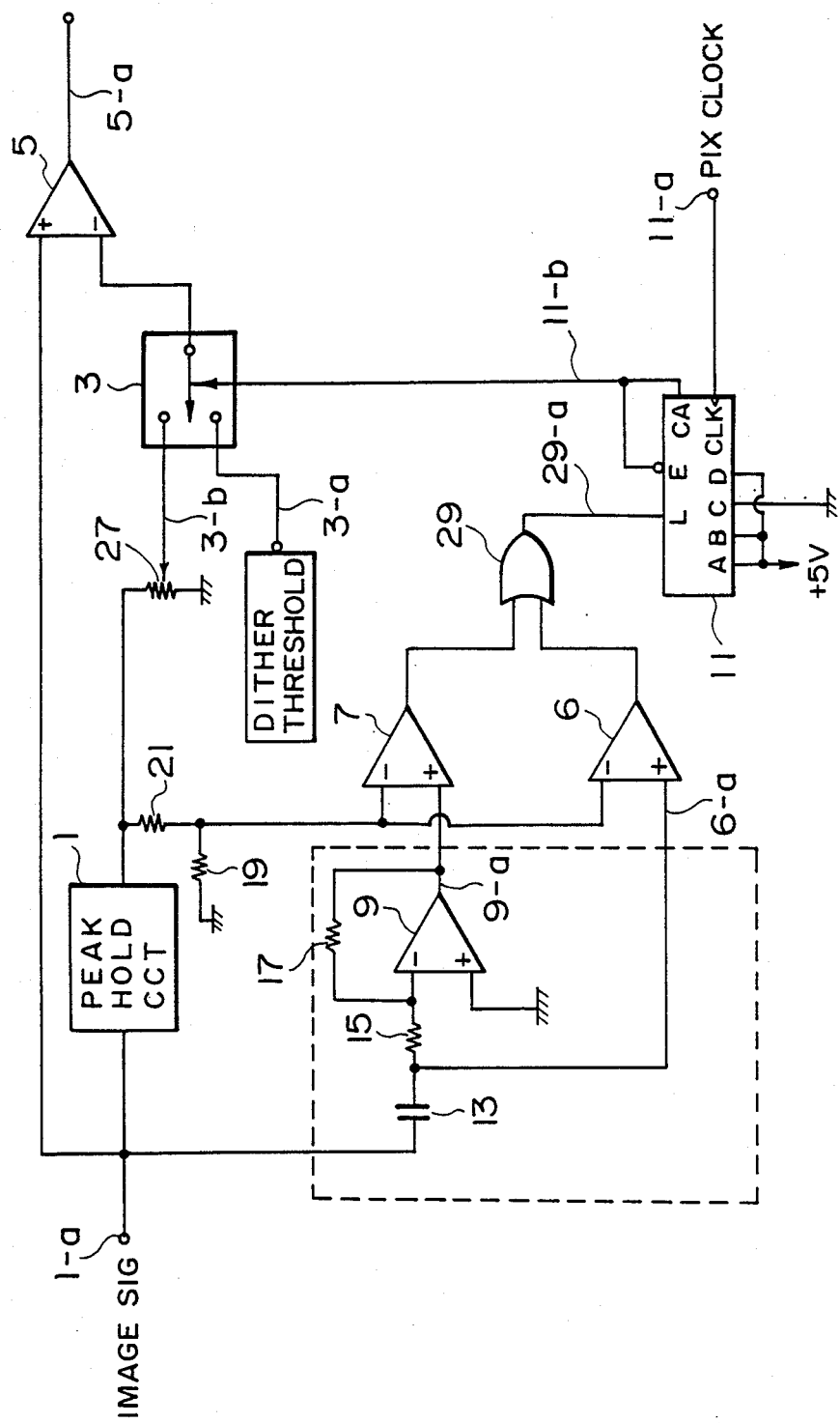
FIG. 6 is a circuit diagram to explain another embodiment.

Also, the circuit arrangement can be simplified by directly inputting the output of the capacitor 13 to the (+) input terminal of the comparator 6 without using the operational amplifier 8 as shown in FIG. 6.

Moreover, the same signals as the signals 6-a and 9-a of FIG. 3 can be obtained from the image signal 1-a by replacing the section surrounded by the broken line in FIG. 3 by another arrangement shown in FIG. 5, which comprises: a sample and hold circuit (an analog switch 49 and a capacitor 51); a difference detecting circuit (operational amplifiers 31, 33 and resistors 37, 39, 41, and 43); and a phase inverting circuit (an operational amplifier 35 and resistors 45 and 47).

As described above, the image signal can be processed on a realtime basis by using the circuit shown in FIG. 3 or 6.

The present invention is not limited to the foregoing embodiments but many modifications and variations are possible within the spirit and scope of the appended claims of the invention.

I claim:

1. An image processing apparatus comprising:
input means for inputting pixel data;
means for processing at least some of the pixel data inputted from said input means;
peak value detection means for detecting a peak value of the pixel data inputted from said input means;
discriminating means for detecting an amount of change in density level of the pixel data and discriminating an image content relating to the pixel data for each pixel by using a detected amount of change in density level and an output from said peak value detecting means; and
means for selecting a process mode of said processing means in accordance with the results of said discrimination.

2. An image processing apparatus according to claim 1, wherein said discriminating means has differentiating means for differentiating the pixel data inputted from said input means and discriminates the image content relating to said pixel data in accordance with the result of said differentiation and the output from said peak value detecting means.

3. An image processing apparatus according to claim 1, wherein said processing means includes half-tone process means for performing half-tone process for the pixel data and non-half-tone process means for for performing a non-half-tone process for the pixel data, and in which said selecting means selects either said half-tone process means or said non-half-tone process means in accordance with the result of said discrimination.

4. An image processing apparatus according to claim 3, wherein said half-tone process means has dither process means.

5. An image processing apparatus according to claim 3, wherein said non-half-tone process means determines a threshold value for binarizing the pixel data on the basis of an output of said peak value detecting means.

6. An image processing apparatus according to claim 3, wherein said selecting means retains the selection of said non-half-tone process means mode by said non-half-tone process means for a predetermined period of time irrespective of the result of said discrimination in the case where said non-half-tone process means is selected.

7. An image processing apparatus comprising:
input means for inputting pixel data; and
means for processing at least some of the pixel data inputted from said input means,
wherein said process means has means for discriminating an image content relating to the pixel data, half-tone process means for performing a half-tone process for the pixel data, non-half-tone process means for performing a non-half-tone process for the pixel data, and means for selecting either a half-tone process mode to be carried out by said half-tone process means or a non-half-tone process mode to be carried out by said non-half-tone process means in accordance with the result of said discrimination by said discriminating means, and said process mode select means retains the selection of said non-half-tone process mode for a predetermined period of time irrespective of the result of said discrimination in the case where said non-half-tone process mode is selected.

8. An image processing apparatus according to claim 7, wherein said half-tone process means has dither process means.

9. An image processing apparatus according to claim 7, further comprising means for detecting a peak value of said pixel data, and in which said non-half-tone process means determines a threshold value for binarizing the pixel data on the basis of an output of said peak value detecting means.

10. An image processing apparatus according to claim 7, wherein said discriminating means discriminates whether each said pixel data is half-tone data or non-half-tone data, and said predetermined period of time corresponds to the period for outputting a plurality of said pixel data.

11. An image processing apparatus according to claim 7, wherein said discriminating means has differentiating means for differentiating the pixel data inputted from said input means and discriminates the image content relating to said pixel data in accordance with the result of said differentiation.

12. An image processing apparatus according to claim 11, further comprising means for detecting a peak value of said pixel data, and in which said discriminating means discriminates the image content of said pixel data on the basis of the result of said differentiation and of an output of said peak value detecting means.

13. An image processing apparatus comprising:
input means for inputting pixel data;
means for processing at least some of the pixel data inputted from said input means; and
means for detecting a peak value of pixel data inputted from said input means,
wherein said process means has means for discriminating an image content relating to the pixel data for each pixel, half-tone process means for performing a half-tone process for the pixel data, non-half-tone process means for performing a non-half-tone process for pixel data, and means for selecting either a half-tone process mode by said half-tone process means or a non-half-tone process mode by said non-half-tone process means in accordance with the result of said discrimination by said discriminating means, and wherein said non-half-tone process means determines a threshold value for binarizing the pixel data on the basis of an output of said peak value detecting means.

14. An image processing apparatus according to claim 13, wherein said half-tone process means has dither process means.

15. An image processing apparatus according to claim 13, wherein said process mode select means retains the selection of said non-half-tone process mode for a predetermined period of time irrespective of the result of said discrimination in the case where said non-half-tone process mode is selected.

16. An image processing apparatus according to claim 13, wherein said discriminating means has differentiating means for differentiating the pixel data inputted from said input means and discriminates the image content relating to said pixel data in accordance with the result of said differentiation.

17. An image processing apparatus according to claim 16, wherein said discriminating means discriminates the image content of said pixel data on the basis of the result of said differentiation and of an output of said peak value detecting means.

18. An image processing apparatus comprising:
input means for inputting pixel data;
means for processing the pixel data inputted from said input means; and
means for detecting a peak value of said pixel data inputted from said input means,
wherein said process means has means for discriminating an image content relating to the pixel data for each pixel, half-tone process means for performing a half-tone process for the pixel data, non-half-tone process means for performing a non-half tone process for pixel data, and means for selecting either a half-tone process mode by said half-tone process means or a non-half-tone process mode by said non-half-tone process means in accordance with the result of said discrimination by said discriminating means, wherein said discriminating means includes a sample and hold circuit receiving the pixel data, and wherein said non-half-tone process means determines a threshold value for binarizing the pixel data on the basis of an output of said peak value detecting means.

19. An image processing apparatus according to claim 18, wherein said half-tone process means has dither process means.

20. An image processing apparatus according to claim 18, wherein said process mode select means retains the selection of said non-half-tone process mode for a predetermined period of time irrespective of the result of said discrimination in the case where said non-half-tone process mode is selected.

21. An image processing apparatus according to claim 18, wherein said discriminating means includes a difference detecting circuit and a phase inverting circuit.

22. An image processing apparatus according to claim 18, wherein said discriminating means forms a signal representing an amount of change in a density level of the pixel data by using said sample and hold circuit, and discriminates image content of the pixel data on the basis of said change amount representing signal and an output of said peak value detecting means.

23. An image processing apparatus according to claim 18, where said pixel data is an analog image signal.

* * * * *

UNITED STATES PATENT AND TRADEMARK OFFICE
CERTIFICATE OF CORRECTION

PATENT NO. : 4,903,143
DATED : February 20, 1990
INVENTOR(S) : MASAHIRO SAKAMOTO Page 1 of 2

It is certified that error appears in the above-identified patent and that said Letters Patent is hereby corrected as shown below:

IN [57] ABSTRACT

Line 6, "inputed" should read --inputted--.
Line 16, "deter-" should read --predeter- --.

COLUMN 1

Line 18, "the" should read --a--.

COLUMN 2

Line 4, "to" should read --be--.
Line 7, "DRAWING" should read --DRAWINGS--.
Line 30, "an outline" should read --a feature--.
Line 43, "selected" should read --or selected--.

COLUMN 3

Line 14, "and" (second occurrence) should read --an--.

COLUMN 4

Line 61, "above described" should read
--above-described--.

UNITED STATES PATENT AND TRADEMARK OFFICE
CERTIFICATE OF CORRECTION

PATENT NO. : 4,903,143
DATED : February 20, 1990
INVENTOR(S) : MASAHIRO SAKAMOTO It is certified that error appears in the above-identified patent and that said Letters Patent is hereby corrected as shown below:

COLUMN 5

Line 51, "half-tone process" should read --a half-tone process--.
    Line 52, "for for" should read --for--.
    Line 66, "said non-half-tone process means mode by" should be deleted.

COLUMN 8

Line 33, "where" should read --wherein--.

Signed and Sealed this

Sixteenth Day of April, 1991

Attest:

HARRY F. MANBECK, JR.

Attesting Officer      Commissioner of Patents and Trademarks